United States Patent
Tsujikawa et al.

(10) Patent No.: US 12,228,295 B2
(45) Date of Patent: Feb. 18, 2025

(54) AREA-SPECIFIC ENVIRONMENT MANAGEMENT SYSTEM FOR PROVIDING ENVIRONMENT IN WHICH AROUSAL LEVEL IS ADJUSTED, METHOD, AND RECORDING MEDIUM THEREFOR

(71) Applicants: NEC CORPORATION, Tokyo (JP); DAIKIN INDUSTRIES, LTD., Osaka (JP)

(72) Inventors: Masanori Tsujikawa, Tokyo (JP); Yoshifumi Onishi, Tokyo (JP); So Yamada, Tokyo (JP); Toshinobu Ogatsu, Tokyo (JP); Yukihiro Kiuchi, Tokyo (JP); Sho Ohtani, Tokyo (JP)

(73) Assignees: NEC CORPORATION, Tokyo (JP); DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/499,395

(22) PCT Filed: Mar. 30, 2017

(86) PCT No.: PCT/JP2017/013448
§ 371 (c)(1),
(2) Date: Sep. 30, 2019

(87) PCT Pub. No.: WO2018/179289
PCT Pub. Date: Oct. 4, 2018

(65) Prior Publication Data
US 2020/0056797 A1    Feb. 20, 2020

(51) Int. Cl.
*F24F 11/30* (2018.01)
*F24F 1/02* (2019.01)
(Continued)

(52) U.S. Cl.
CPC ............... *F24F 1/02* (2013.01); *F24F 11/30* (2018.01); *F24F 11/64* (2018.01); *F24F 11/65* (2018.01);
(Continued)

(58) Field of Classification Search
CPC .. F24F 11/30; F24F 11/80; F24F 11/64; F24F 11/65; F24F 2110/20; F24F 2120/12;
(Continued)

(56) References Cited

U.S. PATENT DOCUMENTS

2009/0255997 A1 * 10/2009 Goldmann ............. F24F 3/052
                                                            236/1 B
2013/0218035 A1 *  8/2013 Masuda .................... A61B 5/18
                                                            600/508
(Continued)

FOREIGN PATENT DOCUMENTS

JP    2004-318266 A    11/2004
JP    2005-127690 A     5/2005
(Continued)

OTHER PUBLICATIONS

International Search Report for PCT Application No. PCT/JP2017/013448, mailed on Jun. 27, 2017.
(Continued)

*Primary Examiner* — Tameem D Siddiquee
(74) *Attorney, Agent, or Firm* — Sughrue Mion, PLLC

(57) ABSTRACT

Provided an area-specific environment management system, which manages an environment in an individual one of a plurality of areas, the system including: a biological information sensor that acquires biological information about at least one of an individual and a group who belongs to an individual one of the areas; an environmental information sensor that acquires environmental information about an individual one of the areas; an arousal level estimation
(Continued)

section that estimates an arousal level with respect to the biological information by using an arousal level estimation model; and an environment provision section that provides an environment to an individual one of the areas based on the arousal level and the environmental information, wherein the arousal level includes, as a state to which the arousal level belongs, a state from sleepy until awakened; a wakeful state; and an excessively wakeful state, and wherein the environment provision section includes an individual control mode corresponding to a state to which the arousal level belongs and manages an environment to be provided to an individual one of the areas based on the control mode.

16 Claims, 8 Drawing Sheets

(51) Int. Cl.
| | | |
|---|---|---|
| *F24F 11/64* | (2018.01) | |
| *F24F 11/65* | (2018.01) | |
| *F24F 11/80* | (2018.01) | |
| *G05B 13/04* | (2006.01) | |
| *G05B 19/042* | (2006.01) | |
| *F24F 110/10* | (2018.01) | |
| *F24F 110/20* | (2018.01) | |
| *F24F 120/12* | (2018.01) | |
| *F24F 120/14* | (2018.01) | |
| *F24F 130/30* | (2018.01) | |
| *F24F 130/40* | (2018.01) | |

(52) U.S. Cl.
CPC ............ *F24F 11/80* (2018.01); *G05B 13/042* (2013.01); *G05B 19/042* (2013.01); *F24F 2110/10* (2018.01); *F24F 2110/20* (2018.01); *F24F 2120/12* (2018.01); *F24F 2120/14* (2018.01); *F24F 2130/30* (2018.01); *F24F 2130/40* (2018.01); *F24F 2221/38* (2013.01); *G05B 2219/25425* (2013.01); *G05B 2219/2614* (2013.01)

(58) Field of Classification Search
CPC ............... F24F 2120/14; F24F 2130/40; F24F 2110/10; F24F 2130/30; F24F 2221/38; F24F 11/72; G05B 13/042; G05B 19/042; G05B 2219/25425; G05B 2219/2614; G05B 2219/2625

See application file for complete search history.

(56) References Cited

U.S. PATENT DOCUMENTS

| | | | |
|---|---|---|---|
| 2014/0269223 A1* | 9/2014 | Mokhnatkina | G04G 21/025 368/73 |
| 2015/0272504 A1* | 10/2015 | Giancardo | A61B 5/7246 600/595 |
| 2016/0179075 A1* | 6/2016 | Shin | H04W 4/70 700/275 |
| 2017/0003043 A1* | 1/2017 | Thiébaux | F24F 11/30 |
| 2018/0031264 A1* | 2/2018 | Atchison | G05B 19/048 |
| 2018/0073760 A1* | 3/2018 | Smith | F24F 11/66 |
| 2018/0289314 A1* | 10/2018 | Reifman | A61B 5/1118 |
| 2019/0099009 A1* | 4/2019 | Connor | A61B 5/398 |

FOREIGN PATENT DOCUMENTS

| | | | | |
|---|---|---|---|---|
| JP | 2006-068458 A | | 3/2006 | |
| JP | 4311130 B2 | | 8/2009 | |
| JP | 2009-201676 A | | 9/2009 | |
| JP | 4682539 B2 | | 5/2011 | |
| JP | 2012-001056 A | | 1/2012 | |
| JP | 2015-029647 A | | 2/2015 | |
| JP | 2015-108469 A | | 6/2015 | |
| JP | 2015-232408 A | | 12/2015 | |
| JP | 2016-137138 A | | 8/2016 | |
| JP | 2016-147010 A | | 8/2016 | |
| KR | 20080087448 | * | 10/2008 | ............ G04G 13/02 |
| WO | 2017/017784 A1 | | 2/2017 | |

OTHER PUBLICATIONS

Communication dated Jul. 26, 2022 from the Japanese Patent Office in Application No. 2021-134334.

* cited by examiner

AREA-SPECIFIC ENVIRONMENT MANAGEMENT SYSTEM FOR PROVIDING ENVIRONMENT IN WHICH AROUSAL LEVEL IS ADJUSTED, METHOD, AND RECORDING MEDIUM THEREFOR

This application is a National Stage Entry of PCT/JP2017/013448 filed on Mar. 30, 2017, the contents of all of which are incorporated herein by reference, in their entirety.

FIELD

The present invention relates to an area-specific environment management system, method, and program.

BACKGROUND

As a related technology that provides area-specific environments, for example, PTL 1 discloses an area-specific environment management system that provides an environment to each of a plurality of areas. This system includes a detection apparatus that detects an office work status about at least one of an individual and a group who belong to their respective areas and an environment provision apparatus that provides an environment to each of the areas based on the office work status about at least one of the individual and the group who belong to their respective areas. The office work status includes time periods to which the respective office works belong. The environment provision apparatus includes a control mode that corresponds to each time period to which each office work belongs and provides an environment to each of the respective areas based on a corresponding one of the control modes.

In addition, PTL 2 discloses an area-specific environment management system that provides an environment about at least one of temperature, humidity, airflow, smell, sound, and light to each of a plurality of areas. This system includes a detection unit that detects arousal level about at least one of an individual and a group who belong to their respective areas, an environment provision unit that provides a preferable environment to each of the areas based on the arousal level and suitable arousal level, which is determined based on a work content of at least one of the individual and the group who belong to their respective areas, a first storage unit that stores a correlation between the work content and a suitable arousal level per at least one of the individual and the group, a second input unit to which environment-based effects, which are effects on the individual or the group obtained by the preferable environment provided by the environment provision section, are inputted, and a third storage unit that stores a correlation between the environment-based effect and the arousal level corresponding to the environment-based effects per at least one of the individual and the group. The suitable arousal level stored in the first storage unit is updated by a new suitable arousal level calculated based on the correlation between the environment-based effects and the arousal level stored in the third storage unit.

Regarding the arousal level, as a related technology that estimates the above arousal level, for example, PTL 3 discloses a working-state arousal level estimation unit that can select an appropriate model based on a state of an estimation target and perform highly accurate estimation in view of the state of the individual. This apparatus includes a prepared database which stores prepared data which associates a feature value indicating heart rate variation of a user during working who is a measurement target of the prepared-data with information about information processing capability of each of the users during working, at the same time point. A feature value indicating heart rate variation of the estimation target user during working is calculated, and the information processing capability value of this estimation target user is estimated based on the calculated feature value indicating the heart rate variation and the prepared data stored in the prepared database. A regression model is created by using the feature values indicating the heart rate variation of the prepared-data measurement target user during working as an explanatory variable and by using a work result of the user at the same time point as a response variable. Regression coefficients calculated in the process of creating a regression model are stored in the above prepared database in association with the feature values indicating the heart rate variation as the above explanatory variable. Next, capability estimation means reads regression coefficients corresponding to the calculated feature value indicating the heart rate variation from the prepared database and calculates an estimated information processing capability value of the estimation target user from the regression coefficient and the calculated feature value about the heart rate variation.

PTL 1: Japanese Patent No. 4311130
PTL 2: Japanese Patent No. 4682539
PTL 3: Japanese Patent Kokai Publication No. JP-2016-137138A

SUMMARY

Hereinafter, the related technologies will be analyzed.

In the area-specific environment management systems disclosed in the above PTLs 1 and 2, information about office work status or work content need to be detected, and control mode corresponding to the information is selected to provide an environment, thus optimally adjusting the arousal level of at least one of an individual and a group and trying to improve productivity of the individual, etc.

However, it is not always easy to detect information about office work status or work content. If information about office work status or work content cannot be detected properly, the area-specific environment management systems cannot provide their desired advantageous effects.

Thus, there is a demand for realization of an area-specific environment provision technology, which can provide environment for adjusting arousal level of an individual, etc. and adjust productivity of the individual, etc. to a desired state, without detecting information about office work status or work content (findings by the present inventors).

The present invention provides a system, an apparatus, a method, and a program, each solving the above problem.

According to an aspect of the present invention, there is provided an area-specific environment management system which manages an environment in an individual one of a plurality of areas, the system comprising: a biological information sensor that acquires biological information about at least one of an individual and a group who belongs to an individual one of the areas; an environmental information sensor that acquires environmental information about an individual one of the areas; an arousal level estimation section that estimates an arousal level with respect to the biological information by using an arousal level estimation model; and an environment provision section that provides an environment to an individual one of the areas based on the arousal level and the environmental information, wherein the arousal level includes, as a state to which the arousal level belongs, a state from sleepy until awakened; a wakeful state; and an excessively wakeful state; and wherein the environment provision section includes an individual control mode corresponding to a state to which the arousal level belongs and manages an environment to be provided to an individual one of the areas based on the control mode.

According to another aspect of the present invention, there is provided an area-specific environment management method that manages an environment in an individual one of a plurality of areas, the method comprising:
  acquiring, from a biological information sensor, biological information about at least one of an individual and a group who belongs to an individual one of the areas;
  acquiring, from an environmental information sensor, environmental information about an individual one of the areas;
  estimating an arousal level with respect to the biological information by using an arousal level estimation model; and
  providing an environment to an individual one of the areas based on the arousal level and the environmental information,
  wherein the arousal level includes, as a state to which the arousal level belongs, a state from sleepy until awakened; a wakeful state; and an excessively wakeful state; and wherein in providing an environment to the area, the method comprising:
  having an individual control mode corresponding to a state to which the arousal level belongs; and
  managing an environment to be provided to an individual one of the areas based on the control mode.

According to another aspect of the present invention, there is provided a program causing a computer that constitutes an area-specific environment management system that manages an environment in an individual one of a plurality of areas, to perform processing comprising:
  acquiring, from a biological information sensor, biological information about at least one of an individual and a group who belongs to an individual one of the areas;
  acquiring, from an environmental information sensor, environmental information about an individual one of the areas;
  estimating an arousal level with respect to the biological information by using an arousal level estimation model, wherein the arousal level includes, as a state to which the arousal level belongs, a state from sleepy until awakened; a wakeful state; and an excessively wakeful state; and
  providing an environment to an individual one of the areas based on the arousal level and the environmental information, wherein an individual control mode is provided corresponding to a state to which the arousal level belongs and an environment to be provided to an individual one of the areas is managed based on individual control mode.

According to still another aspect of the present invention, there is provided a non-transitory computer-readable recording medium such as a semiconductor storage such as a computer-readable recording medium storing the program according to the above mode (for example, a random access memory (RAM), a read-only memory (ROM), or an electrically erasable and programmable ROM (EEPROM)), a hard disk drive (HDD), a compact disc (CD), or a digital versatile disc (DVD).

The present invention can provide a system, a method, and a program, each enabled to provide an environment for adjusting arousal level of an individual, etc. and adjust productivity of an individual, etc. to a desired state, without detecting information about office work status or work content. Still other features and advantages of the present invention will become readily apparent to those skilled in this art from the following detailed description in conjunction with the accompanying drawings where only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

Figure 1:
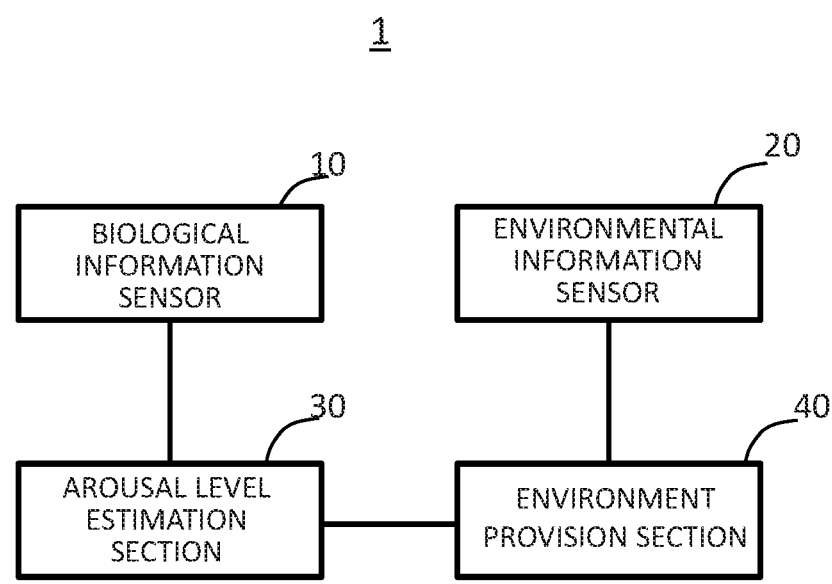
FIG. 1 is a diagram illustrating a configuration example of a system according to an example embodiment of the present invention.

An example embodiment of the present invention will be described. FIG. 1 is a diagram illustrating a configuration example according to an example embodiment of the present invention. Referring to FIG. 1, an area-specific environment management system 1 according to an example embodiment of the present invention includes a biological information sensor 10, an environmental information sensor 20, an arousal level estimation section 30, and an environment provision section 40. It is noted that while a single biological information sensor 10 and a single environmental information sensor 20 are illustrated in FIG. 1, a plurality of biological information sensors 10 may be provided for an individual or a group. Likewise, a plurality of environmental information sensors 20 may be provided for an individual or a group.

The arousal level estimation section 30 estimates, for example, an arousal level of an individual based on biological information detected by the biological information sensor 10. The arousal level estimation section 30 may estimate the arousal level by using, for example, an arousal level estimation model(s).

For example, the arousal level belongs to one of the following states:
  a state from sleepy until awakened (also referred to as "a low arousal state");
  a state of being awakened (also referred to as "a wakeful state"; and an excessively wakeful state (also referred to as "a high arousal state").

The arousal level estimation section 30 may include at least a first arousal level estimation model (a low arousal level estimation model) corresponding to the low arousal state and a second arousal level estimation model (a high arousal level estimation model) corresponding to the high arousal state.

The environment provision section 40 provides an environment to an individual one of the areas based on the arousal level and environmental information. The environment provision section 40 may include a control mode corresponding to the state to which the arousal level estimated by the arousal level estimation section 30 belongs and manage an environment of an individual area based on each control mode.

The biological information sensor 10 and the arousal level estimation section 30 may be communicatively connected with each other via wireless or wired connection. The environmental information sensor 20 and the environment provision section 40 may be communicatively connected with each other via wireless or wired connection. The arousal level estimation section 30 and the environment provision section 40 may be configured as a single unit or separate node apparatuses that are communicatively connected with each other via a communication network.

Figure 2:
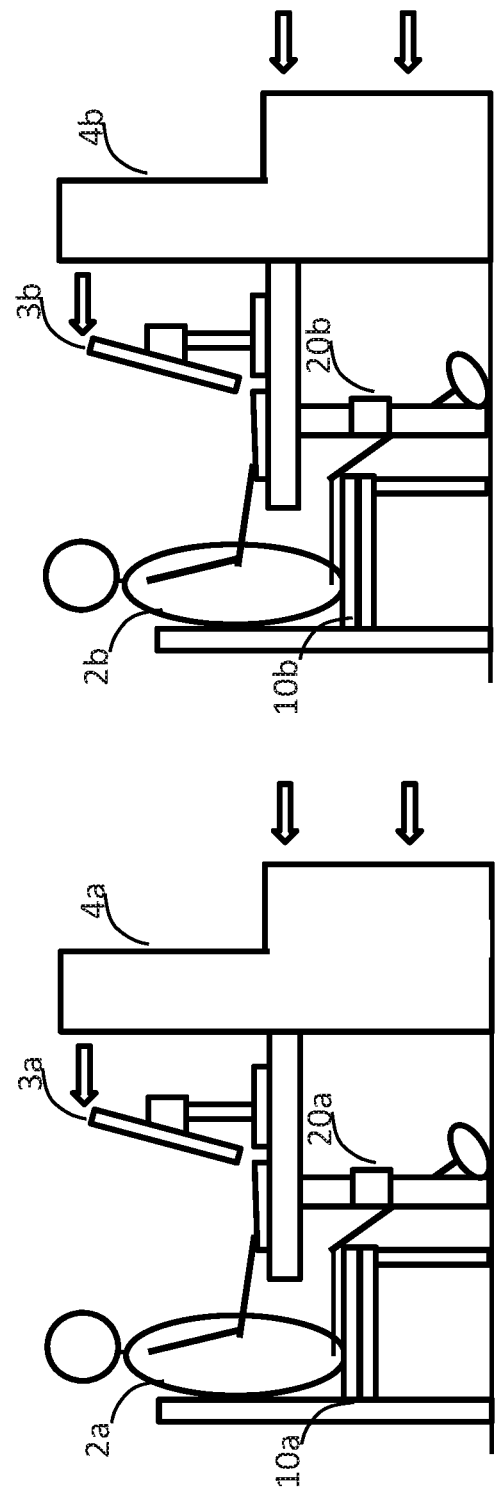
FIG. 2 is a diagram illustrating the example embodiment of the present invention.

FIG. 2 is a diagram illustrating the area-specific environment management system 1 according to the example embodiment. The area-specific environment management system 1 includes personal air conditioners 4a and 4b as apparatuses that provide environments to their respective areas, biological information sensors 10a and 10b, and personal computers (terminal apparatuses) 3a and 3b.

The personal air conditioners 4a and 4b individually provide air-conditioning to individuals 2a and 2b (arrow-⇒represents airflow). It is noted that while FIG. 2 illustrates a configuration example in which the area-specific environment management system 1 includes the two personal air conditioners 4a and 4b, for simplicity, the number of personal air conditioners is not of course limited to 2. Only one personal air conditioner may be provided in the areas of the plurality of individuals 2a and 2b. In this case, the plurality of individuals 2a and 2b may be treated as a group who belongs to a shared area. While air conditioners such as the personal air conditioners 4a and 4b adjust the temperature, humidity, or cleanness of air in a room or a specific space by, for example, taking in outside air, the apparatuses that provide environments to the areas according to the present example embodiment are not limited to these air conditioners. For example, cooling and heating machines (air conditioners), humidifiers, etc. may of course be used alternatively.

The biological information sensors 10a and 10b are sheet-type biological information sensors that are arranged on chairs and that sense heart rate, breathing, or physical movements of the individuals 2a and 2b who sit on their respective chairs. The biological information sensors 10a and 10b are not limited to such sheet-type sensors and may be microwave biosensors or the like that are arranged at locations away from the individuals 2a and 2b and that sense heart rate or breathing of the users in a non-contact manner. The biological information sensors 10a and 10b may transmit biological information to the arousal level estimation section 30 via wireless communication such as Bluetooth. Alternatively, the biological information sensors 10a and 10b may transmit biological information to the arousal level estimation section 30 via wired communication such as a USB (Universal Serial Bus), RS232C, or an optical cable. The biological information sensors 10 may be, for example, wristwatch (watch) type heart rate meters having wireless communication functions such as Bluetooth. The biological information sensors 10 may capture images such as face images of individuals by using cameras arranged on front faces of displays of the personal computers 3a and 3b. In this case, the biological information sensors 10 may analyze image data to detect blinks, postures, physical movements, or the like. Alternatively, the biological information sensors 10 may be glasses-like sensors that can detect gaze angles, rates of blinks, or the like.

Environmental information sensors 20a and 20b are sensors that sense environmental information about the respective areas (sensors for the temperature, humidity, airflow, smell, sound, and light). While the environmental information sensor 20a (20b) is arranged at a leg portion of the table of the personal air conditioner 4a (4b), the present example embodiment is not limited to this configuration. The area-specific environment management system 1 may, as a matter of course, include a plurality of sensors for the temperature, humidity, light, etc. as the environmental information sensor 20a (20b).

The personal computers (terminal apparatuses) 3a and 3b may be desktop or laptop personal computers (PCs) arranged on the boards (tables) of the personal air conditioners 4a and 4b. The personal computers (terminal apparatuses) 3a and 3b may each constitute the environment provision section 40 in FIG. 1. In this case, the personal computers (terminal apparatuses) 3a and 3b are connected to the personal air conditioners 4a and 4b and the environmental information sensors 20a and 20b and control the personal air conditioners 4a and 4b based on the arousal level and environmental information. In addition, the personal computers (terminal apparatuses) 3a and 3b may be connected to the biological information sensors 10a and 10b and may each constitute the arousal level estimation section 30 in FIG. 1. The arousal level estimation section 30 and the environment provision section 40 in FIG. 1 may be constituted by a corresponding one of the personal computers (terminal apparatuses) 3a and 3b.

Figure 3:
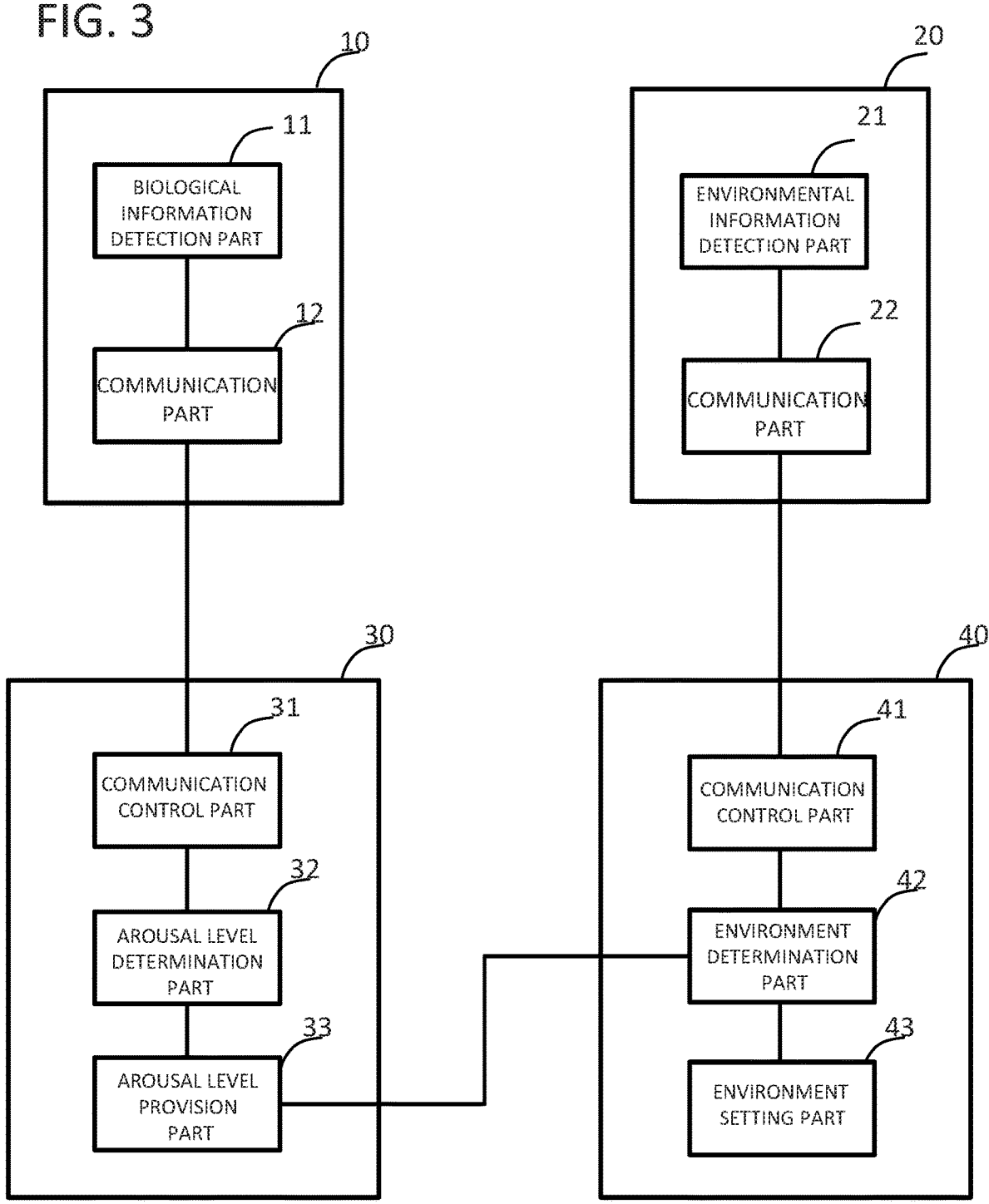
FIG. 3 is a diagram illustrating a configuration example according to the example embodiment of the present invention.

FIG. 3 is a diagram illustrating a configuration example of the individual section in the area-specific environment management system in FIG. 1. As illustrated in FIG. 3, the individual biological information sensor 10 includes a biological information detection part 11 and a communication part 12. The communication part 12 may be configured to transmit biological information to the arousal level estimation section 30 via wireless or wired communication. The environmental information sensor 20 includes an environmental information detection part 21 and a communication part 22. The communication part 22 may be configured to transmit environmental information to the environment provision section 40 via wireless or wired communication.

The arousal level estimation section 30 includes a communication control part 31, an arousal level determination part 32, and an arousal level provision part 33.

For example, the communication control part 31 instructs one or a plurality of biological information sensors 10 to start/stop acquisition of biological information or transmit biological information and receive biological information from a plurality of biological information sensors 10. An individual one of a plurality of biological information sensors 10 has identification information (ID) or the like, and the communication part 12 in the individual biological information sensor 10 may add the identification information (ID) of this biological information sensor 10 to the biological information acquired by the biological information detection part 11 to transmit the biological information with the ID to the communication control part 31 in the arousal level estimation section 30.

Based on the identification information (ID) of the biological information sensor 10, the arousal level determination part 32 determines which area's biological information sensor (10a or 10b in FIG. 2) has transmitted the biological information and individually estimates the arousal level of the individual (2a or 2b in FIG. 2) in the area. In this operation, the arousal level determination part 32 may individually estimate an arousal level of the individual (2a or 2b in FIG. 2) from a learned arousal level estimation model(s), based on the biological information about the individual (2a or 2b in FIG. 2).

The arousal level provision part 33 transmits the arousal level estimated by the arousal level determination part 32 to the environment provision section 40.

The environment provision section 40 includes a communication control part 41, an environment determination part 42, and an environment setting section 43.

The communication control part 41 instructs one or a plurality of environmental information sensors 20 to start/stop acquisition of environmental information or transmit environmental information and receives environmental information from a plurality of environmental information sensors 20.

An individual one of a plurality of environmental information sensors 20 has identification information (an ID) or the like, and the communication part 22 in the individual environmental information sensor 20 may add the identification information (ID) of this environmental information sensor 20 to the received environment information and transmit this environment information to the communication control part 41.

Based on the identification information (ID) of the environmental information sensor 20, the environment determination part 42 determines which area's environmental information sensor 20 that has transmitted the environment information and determines an environment in the determined area. In this operation, the environment determination part 42 may extract a feature value from the environmental information about the area. For example, as an air volume of an air conditioner and a temperature of an air supplied by an air conditioner, a statistical amount such as a minimum value, a maximum value, an average value, or a cycle in change (variation) in a predetermined time period may be used.

The environment determination part 42 receives the arousal level (arousal state) of the individual in the corresponding area estimated based on the biological information from the biological information sensor 10 (10a or 10b in FIG. 2) in the corresponding area from the arousal level estimation section 30 and determines whether the corresponding environment is suitable based on the environmental information in the corresponding area. If the environment is not suitable, the environment determination part 42 determines a suitable environment.

A correspondence table including arousal level and suitable air-conditioning temperatures or air volumes corresponding to the arousal level may be stored in advance in a storage apparatus, and the environment determination part 42 may determine a suitable air-conditioning temperature for the arousal level estimated per area by the arousal level estimation section 30. The correspondence between arousal level and a suitable air-conditioning temperature or the like may be derived, based on a correlation between a arousal level acquired in advance and a suitable air-conditioning temperature.

The environment setting section 43 sets the suitable environment determined by the environment determination part 42. For example, the environment setting section 43 may set the temperature, the air volume, or the like of the personal air conditioner 4a or 4b in FIG. 2 to a setting value corresponding to the suitable environment via wired or wireless connection.

The arousal level estimation section 30 and the environment provision section 40 may be configured as separate apparatuses and connected with each other via a communication network or the like, such as a local area network (LAN), for example. Alternatively, the arousal level estimation section 30 and the environment provision section 40 may be integrally configured as a single unit. In this case, the communication control parts 31 and 41 may be integrated for common use.

Figure 4:
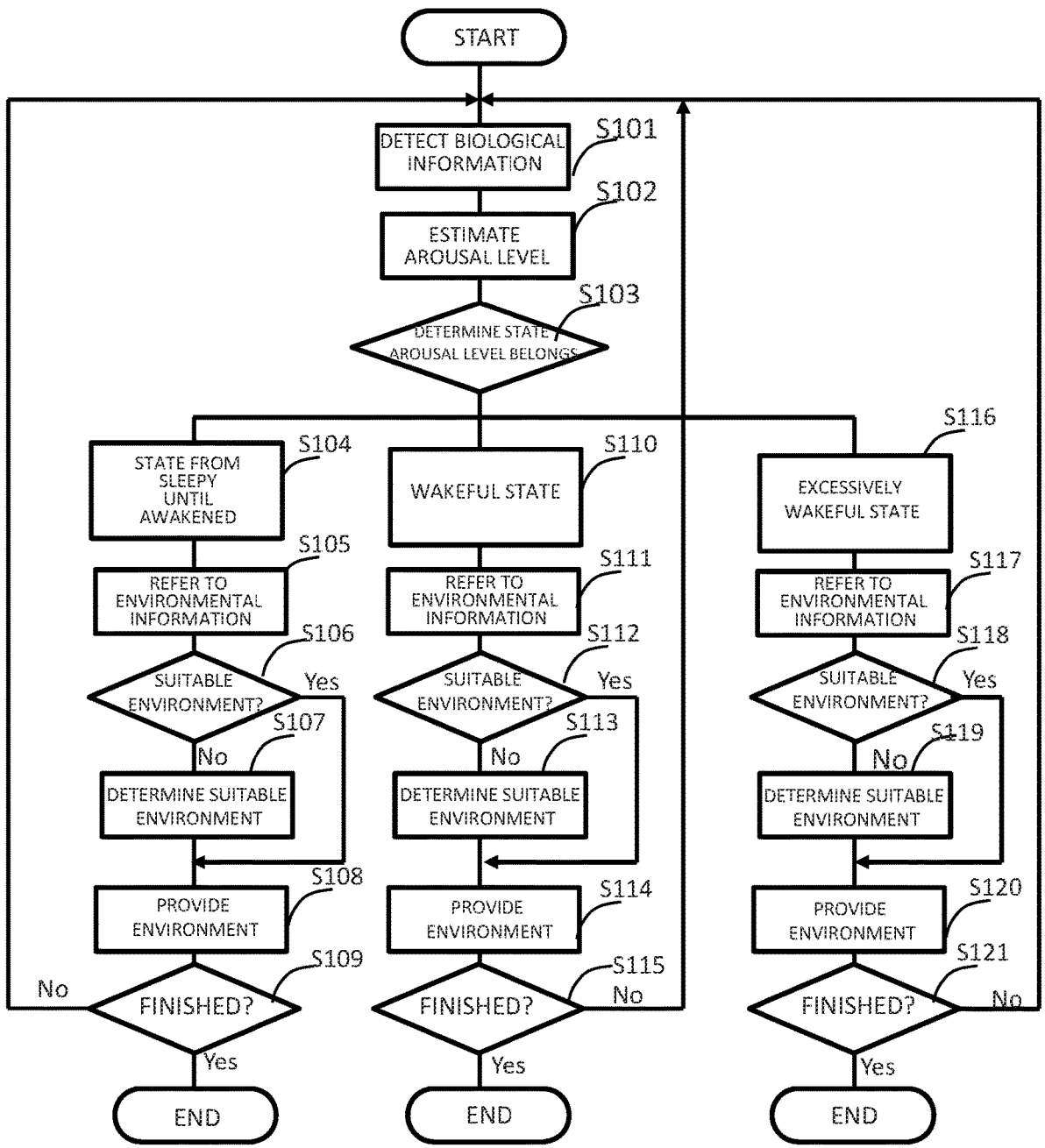
FIG. 4 is a flowchart illustrating an overall operation according to the example embodiment of the present invention.

FIG. 4 is a diagram illustrating a processing procedure according to the example embodiment of the present invention. The processing procedure according to the example embodiment will be described with reference to FIG. 4.

The biological information sensor(s) 10 acquires biological information (for example, at least one of heart rate, breathing, physical movement, posture, etc.) (S101).

The arousal level estimation section 30 estimates an arousal level, based on the biological information (S102). The arousal level estimation section 30 determines a state to which the arousal level belongs from a state from sleepy until awakened (S104), a wakeful state (S110), and an excessively wakeful state (S116) (S103).

In a case where the arousal level belongs to the state from sleepy until awakened (S104), the environment determination part 42 manages an environment in this area in accordance with a control mode corresponding to this state. The environment determination part 42 refers to the environmental information acquired from the environmental information sensor(s) 20 (S105) and determines whether the current environment, which is the state from sleepy until awakened, is a suitable environment (S106). For example, the environment determination part 42 determines whether the control mode used when the arousal state of the individual in this area is the state from sleepy until awakened corresponds to an environment that increases the arousal level of the individual to the wakeful state.

Namely, a comfortable temperature or light wind makes the individual sleepier. Thus, even if such comfortable temperature or light wind is set as a suitable environment in accordance with another control mode, the comfortable temperature or light wind is not always a suitable environment in this control mode.

If the current environment is not a suitable environment, the environment determination part 42 determines a suitable environment (S107). The environment setting section 43 performs a control operation to provide the suitable environment (S108). In this case, when the environment determination part 42 determines the suitable environment, if the arousal state in the area is the state from sleepy until awakened and if the environmental information about the area indicates that, for example, the setting temperature of the air conditioner is an appropriate temperature and the air volume is light wind, the environment determination part 42 may change the light wind, for example, to somewhat powerful wind and set a lower temperature as the environment to be set. In this way, the arousal state can be raised, and the individual can be brought in the wakeful state. In step S109, if not finished (No branch in S109), the processing returns to step S101.

In step S103, in a case where the environment determination part 42 determines that the arousal level belongs to the wakeful state (S110), the environment determination part 42 manages an environment in this area in accordance with a control mode corresponding to this wakeful state. Subsequent steps S111 to S115 after the wakeful state (S110) correspond to the above steps S105 to 109. However, a suitable environment for the wakeful state differs from the suitable environment for the above state from sleepy until awakened. The control mode used for the wakeful state (S110) controls the environment so that this state will continue. The environment determination part 42 may determine whether the current environment information is suitable for the arousal level estimated by the environment determination part 42 based on, for example, a correspondence table including arousal level and suitable air-conditioning temperatures or air volumes (environmental information) corresponding to the arousal level, and determine, if the current environment information is not suitable, suitable environment information based on the above correspondence table.

In a case where the environment determination part 42 determines that the arousal level belongs to the excessively wakeful state (S116), the environment determination part 42 manages an environment in this area in accordance with a control mode corresponding to this wakeful state. Steps S117 to S121 correspond to the above S105 to 109. The environment determination part 42 may determine a suitable environment information so that the excessively wakeful state changes to the wakeful state based on a correspondence table including arousal level and suitable air-conditioning temperatures or air volumes (environmental information) corresponding to the arousal level.

Figure 5:
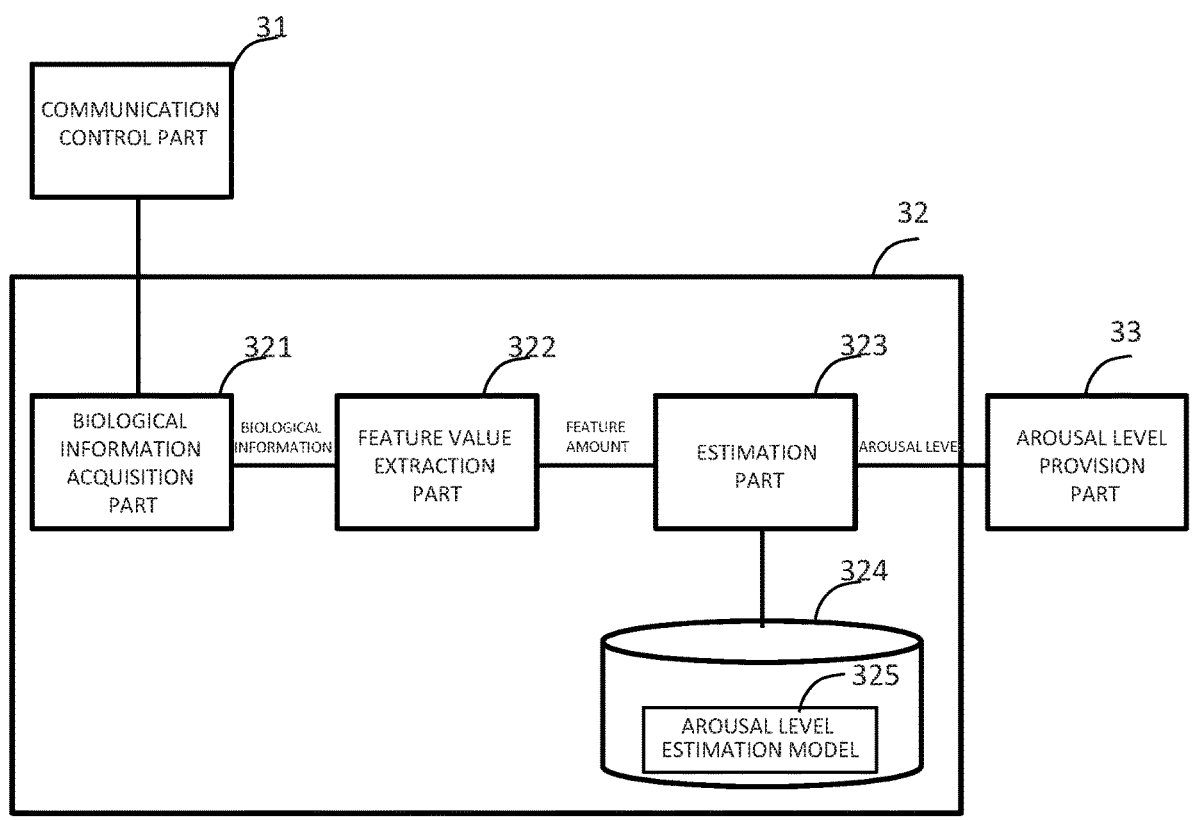
FIG. 5 is a diagram illustrating a configuration example of an arousal level estimation section according to the example embodiment of the present invention.

FIG. 5 is a diagram illustrating a configuration example of the arousal level determination part 32 in FIG. 3. As illustrated in FIG. 5, the arousal level determination part 32 includes a biological information acquisition part 321, a feature value extraction part 322, and an estimation part 323.

The biological information acquisition part 321 receives biological information of an individual detected by the biological information sensor(s) 10 in an estimation target area via the communication control part 31.

The feature value extraction part 322 extracts a feature value from the biological information. For example, the feature value extraction part 322 may extract a feature value by using various kinds of known techniques. For example, the feature value extraction part 322 may extract a feature value by detecting, based on heart rate data of an individual from the sheet type sensor 10a or 10b in FIG. 2, peaks of the amplitude of a heart rate signal, detect an individual interval between the peaks of the amplitude, convert the heart rate interval data into frequency domain data, and calculate a spectrum density with respect to a variation of the heart rate intervals.

The estimation part 323 receives the feature value extracted by the feature value extraction part 322 and estimates the arousal level by using an arousal level estimation model 325 (a model parameter(s)) stored in a storage apparatus 324. Various kinds of techniques may be used to create the arousal level estimation model(s) 325. An example of such techniques will be described below (but not limited to the following technique).

Figure 6:
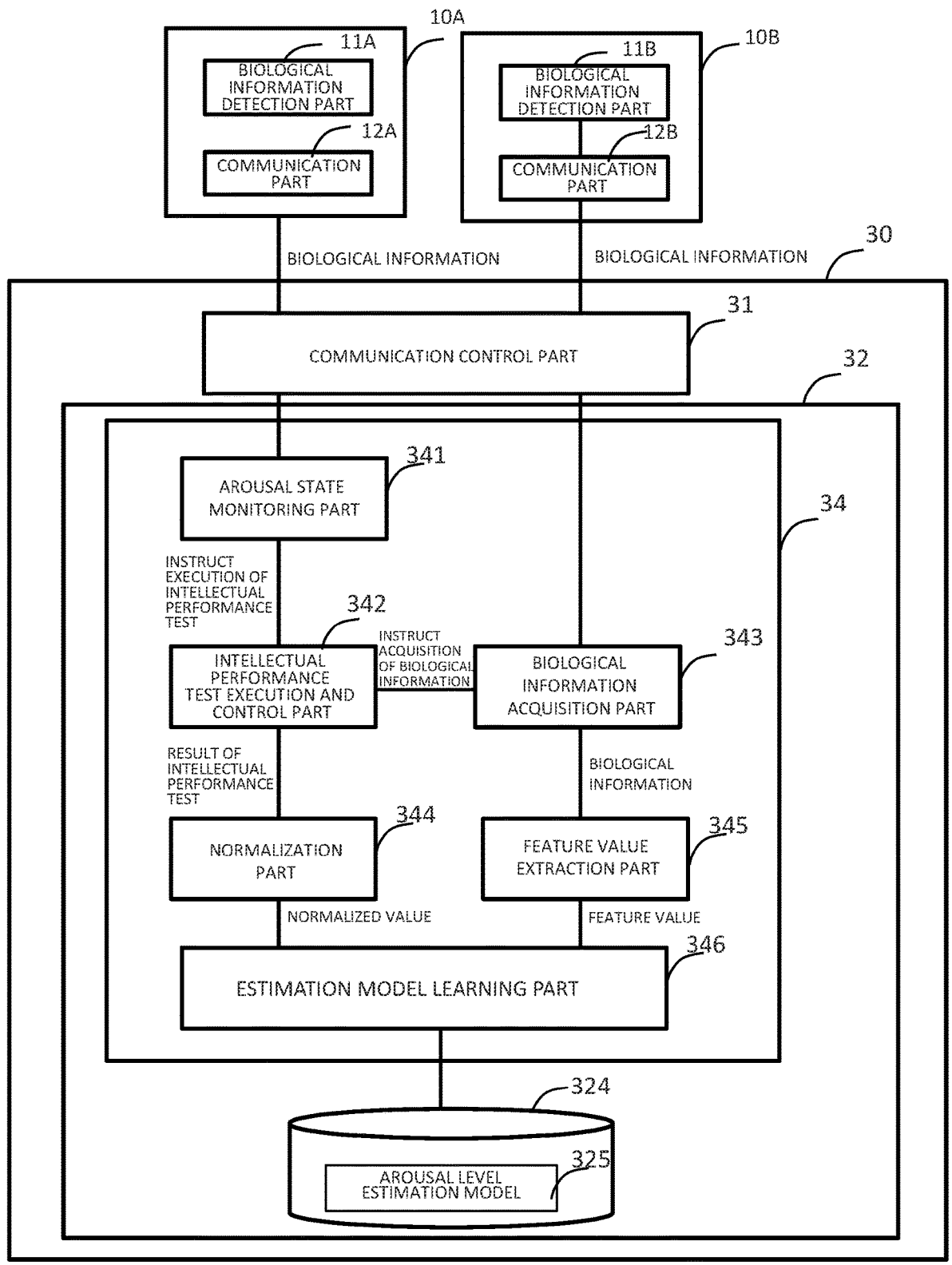
FIG. 6 is a diagram illustrating a configuration example of the arousal level estimation section according to the example embodiment of the present invention.

FIG. 6 is a diagram illustrating an example of a configuration for creating the arousal level estimation model 325 in the arousal level determination part 32 in FIG. 5. The communication control part 31 in FIG. 3 corresponds to the communication control part 31 in FIG. 5.

In the configuration example in FIG. 6, an arousal level model creation part 34 is included in the arousal level determination part 32. The arousal level model creation part 34 includes an arousal state monitoring part 341, an intellectual performance test execution and control part 342, an in-test biological information acquisition part 343, a normalization part 344, a feature value extraction part 345, and an estimation model learning part 346. Biological information sensors 10A and 10B include biological information detection parts 11A and 11B and communication parts 12A and 12B, respectively. The biological information sensors 10A and 10B are sensors that acquire biological information about individuals in their respective areas and may be sensors of the same or different kinds. However, the biological information sensor 10B is the same as the biological information sensor 10a (10b) in FIG. 2.

When creating an arousal level estimation model(s), the arousal state monitoring part 341 acquires biological information about the measurement target individual from the biological information sensor 10A and monitors the arousal state of the measurement target individual based on the biological information. Though not limited thereto, the biological information sensor 10A used when the arousal level estimation mode is created may be an electroencephalograph. For example, an electroencephalograph that picks up brain waves of the target individual may be used, and in this case, a sensor band is attached to a head portion of the target individual. Alternatively, for example, the electroencephalograph may be cap electrodes for brain wave measurement, wherein the cap electrodes have 19 electrodes arranged in accordance with the international 10/20 system.

When the arousal state monitoring part 341 determines that the arousal state of the measurement target individual is the state from sleepy until awakened (low arousal state), for example, the intellectual performance test execution and control part 342 requests the measurement target individual (2a or 2b in FIG. 2) to take an intellectual performance test(s) in accordance with an instruction from the arousal state monitoring part 341. The intellectual performance test execution and control part 342 may instruct, for example, the personal computer 3a or 3b in FIG. 2 to start an intellectual performance test(s).

The measurement target individual (for example, 2a or 2b in FIG. 2) stops working on his/her personal computer (3a or 3b in FIG. 2) and takes the intellectual performance test(s). The intellectual performance test execution and control part 342 may automatically open a screen (window) for the intellectual performance test(s) on a screen of a display of the personal computer (3a or 3b in FIG. 2), and the individual may take the intellectual performance test(s) online. Alternatively, the measurement target individual (for example, 2a or 2b in FIG. 2) may operate his/her personal computer (3a and 3b in FIG. 2) and start an application program for the intellectual performance test(s).

The measurement target individual (for example, 2a or 2b in FIG. 2) enters solutions to the problems displayed on the screen of the personal computer (3a or 3b in FIG. 2) via input means such as a keyboard, a mouse, or the like. When the intellectual performance test execution and control part 342 starts a series of intellectual performance tests (for example, sentence comprehension capability, mathematical processing capability (calculation capability), logical deduction capability, etc.), the biological information acquisition part 343 acquires, from the biological information sensor 10B, biological information about the measurement target individual (for example, 2a or 2b in FIG. 2) taking the intellectual performance tests, based on an instruction from the intellectual performance test execution and control part 342. This biological information sensor 10B is the same as the biological information sensor (for example, the sheet-type biological information sensor 10a or 10b in FIG. 2) from which the biological information acquisition part 321 in FIG. 5 acquires the biological information.

The intellectual performance test execution and control part 342 may notify the measurement target individual (2a or 2b in FIG. 2) of execution of the intellectual performance test via the personal computer (3a or 3b in FIG. 2), and the measurement target individual may take a written test(s) prepared in advance as the intellectual performance test(s). In addition, the intellectual performance test execution and control part 342 may be notified of a result(s) (time needed for the individual to solve a problem(s)) via the personal computer (3a or 3b in FIG. 2).

For example, the normalization part 344 may normalize the results (scores or time needed for the individual to solve the problem) of the intellectual performance tests taken by the measurement target individual (for example, 2a or 2b in FIG. 2) in the low arousal state, the high arousal state (in a stressful state), and in a state between these states, by using representative points (for example, the highest scores, the shortest time needed for the individual to solve the problem, etc.) in a state other than the low arousal state and the high arousal state. Alternatively, the normalization may be performed by using the average of scores within top predetermined percentage, from the highest scores of the results (scores) of the intellectual performance tests taken by the measurement target individual (for example, 2a or 2b in FIG. 2) or an average of the time (needed to solve the problems) within top predetermined percentage from the shortest time of the results of the intellectual performance tests taken by the individual (for example, 2a or 2b in FIG. 2).

For example, assuming a case where the highest score of an intellectual performance test taken by a measurement target individual A is 70 points and the measurement target individual A scores 49 points in the low arousal state, if the normalization is performed by using the highest score, the low arousal state corresponds to 49/70=0.7. Assuming a case where the highest score of the intellectual performance test taken by a different measurement target individual B is 80 points and the measurement target individual B scores 48 points in the low arousal state, if the normalization is performed by using the highest score, the low arousal state corresponds to 48/80=0.6. The scores of the intellectual performance test taken by the measurement target individuals A and B in the low arousal state are 49 points and 48 points, which are about the same points. However, by performing the normalization, their respective low arousal states correspond to 0.7 (70%) and 0.6 (60%). That is, a degree of deterioration of the individual B is larger than that of the individual A. Thus, by causing the normalization part 344 to normalize distributions of scores that differ per measurement target user, for example, determination of a degree of deterioration in the low arousal state can be made common.

The feature value extraction part 345 extracts a feature value from the biological information (for example, heart rate data, etc.) acquired by the biological information acquisition part 343. The biological information and the extracted feature value handled by the feature value extraction part 345 are the same as the biological information and the extract feature value handled by the feature value extraction part 322 in FIG. 5.

The feature value extraction part 345 may acquire, as a feature value (representative value), a value obtained by performing statistical processing on time-series data of a feature value of the biological information that the biological information acquisition part 343 has acquired from a biological information sensor(s) while the measurement target individual (for example, 2a or 2b in FIG. 2) is taking the intellectual performance test (the intellectual performance test may be executed within a predetermined time limit such as within five or ten minutes. Alternatively, the time that the individual needs to solve all the problems may be measured).

The estimation model learning part 346 generates the arousal level estimation model 325. More specifically, the estimation model learning part 346 learns the arousal level estimation model 325 based on the normalized value of the results of the intellectual performance tests and the feature value of the biological information and stores the arousal level estimation model 325 in the storage apparatus 324. While not particularly limited, as the arousal level estimation model 325, regression analysis may be performed by using the feature value of the biological information in the individual arousal state (biological information during the intellectual performance test) as an explanatory variable and the normalized value of a result of the intellectual performance tests as a response variable (explanatory variable). For example, the arousal level estimation model 325 may be obtained by approximating a response variable by an explanatory variable with a linear expression or a polynomial and by deriving coefficients (parameters) that minimizes a residual error. It is noted that examples of the arousal level estimation model 325 are not limited to a linear regression model, and a non-linear regression model may be used as the arousal level estimation model 325.

Furthermore, the estimation model learning part 346 may generate an arousal level estimation model 325 for each of the low arousal state, the high arousal state, and the state between these states.

In addition, the estimation model learning part 346 may give weights to the results of the intellectual performance tests based on the content (job type, position, etc.) of the work of the individual to generate an arousal level estimation model 325. For example, if the target individual works in an accounting division or engages in tax and accounting office work, a larger weight may be given to the result (normalized value) of the intellectual performance test relating to calculation capabilities, as compared with weights given to the results (normalized values) of other tests relating to sentence comprehension capabilities, etc.

Score=W1×(normalized value regarding sentence comprehension capability)+W2×(normalized value regarding calculation capability)+W3×(normalized value regarding logical deduction capability).

W1+W2+W3=1, 0≤W1, W2, W≤1

In contrast, if the individual engages in contract, liaison, patent affairs, and the like, for example, a larger weight may be given to the result (normalized value) of the intellectual performance relating to the test sentence comprehension capabilities, compared with the weights given to the results (normalized values) of other tests.

Figure 7A:
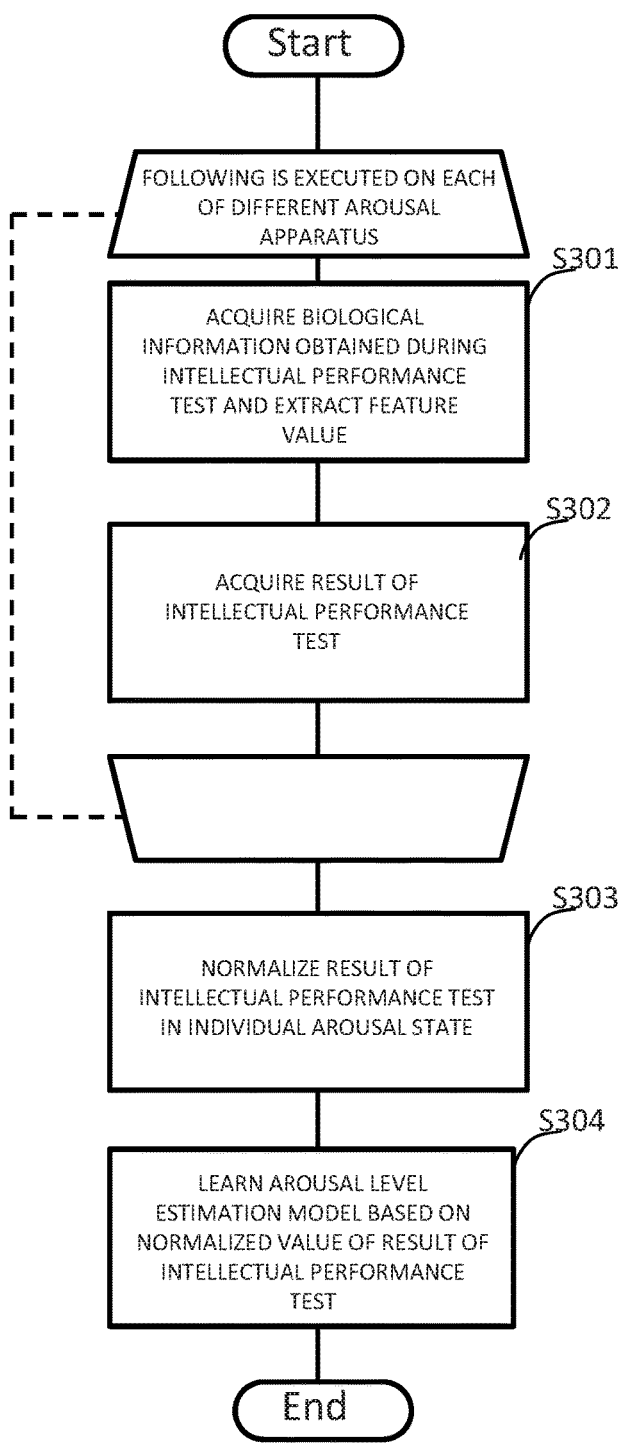
FIGS. 7A and 7B are diagrams illustrating operations of the arousal level estimation section according to the example embodiment of the present invention.

FIG. 7 is a flowchart illustrating operations of the arousal level estimation part 30 described with reference to FIGS. 5 and 6. As illustrated in FIG. 7A, the arousal level estimation model creation part 34 acquires biological information about the measurement target individual (for example, 2a or 2b in FIG. 2) taking the intellectual performance tests in a plurality of arousal states i=1 to N (N is an integer of 2 or more), extracts feature values, and stores the feature values in the storage apparatus in association with the individual arousal states i (S301).

The intellectual performance test execution and control part 342 collects the test results of the intellectual performance tests and stores the test results in association with the individual arousal states i (S302).

As a result of the execution of steps S301 and S302 performed on the arousal states i=1 to N, for example, based on the scores (for example, the highest scores or representative values (statistical values such as first quartiles from the highest scores or medians)) of the test results of the intellectual performance tests acquired in the state other than the state from sleepy until awakened (the low arousal state) and the excessively wakeful state (the high arousal state), the normalization part 344 performs normalization by dividing the test results of the intellectual performance tests taken by the same user (individual) in the individual arousal states (S303).

The estimation model learning part 346 learns an arousal level estimation model 325 based on the feature values extracted by the feature value extraction part 345 and the normalized value of the test results of the intellectual performance tests from the normalization part 344 and stores the arousal level estimation model 325 in the storage apparatus 324 (S304).

Figure 7B:
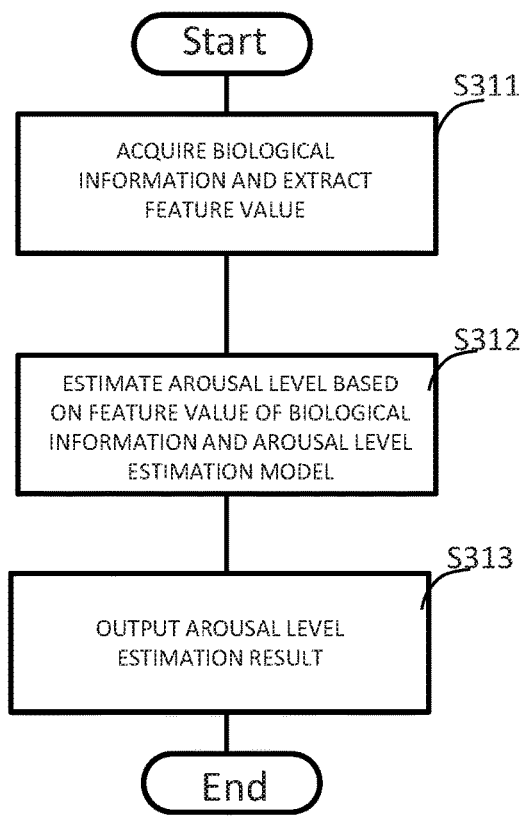

As illustrated in FIG. 7B, the feature value extraction part 322 in the arousal level determination part 32 acquires biological information about the estimation target individual (for example, 2a or 2b in FIG. 2) and extracts a feature value (S311). The estimation target individual and the measurement target individual may be the same individual or different individuals.

The estimation part 323 in the arousal level determination part 32 receives the feature value and estimates the arousal level based on the arousal level estimation model 325 stored in the storage apparatus 324 (S312).

The arousal level provision part 33 outputs the arousal level estimation result to the environment provision section 40 (S313).

Figure 8:
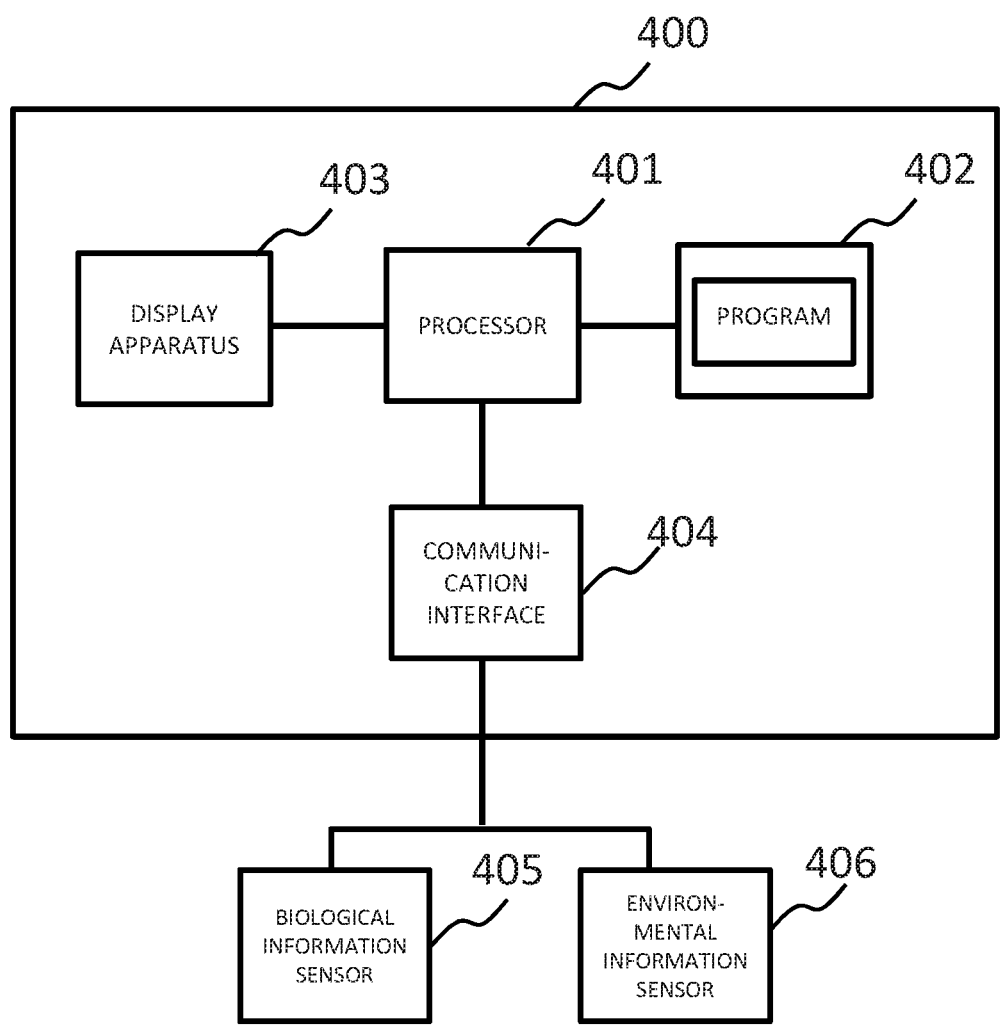
FIG. 8 is a diagram illustrating another example embodiment of the present invention.

FIG. 8 is a diagram illustrating an example of a configuration in which the arousal level estimation part 30 and the environment provision section 40 according to the above example embodiment are implemented on a computer system (apparatus) 400. As illustrated in FIG. 8, the computer system (apparatus) 400 incudes a processor (a central processing unit (CPU) or a data processing apparatus)) 401, a storage apparatus 402 including at least one of a semiconductor memory (for example, a random access memory (RAM), a read-only memory (ROM), an electrically erasable and programmable ROM (EEPROM), or the like), a hard disk drive (HDD), a compact disc (CD), a digital versatile disc (DVD), etc., a display apparatus 403, and a communication interface 404. A program stored in the storage apparatus 402 may cause the processor 401 to execute at least part or all of the processing of the arousal level estimation part 30 and the environment provision section 40. For example, the program may include instructions that cause the processor 401 to perform processing for acquiring biological information about at least one of an individual and a group who belongs to an individual one of the areas from a biological information sensor 405; acquiring environmental information about an individual one of the areas from an environmental information sensor 406; estimating an arousal level with respect to the biological information by using an arousal level estimation model; wherein a state to which the arousal level belongs includes: a state from sleepy until awakened; a wakeful state; and an excessively wakeful state; and providing an environment to an individual one of the areas based on the arousal level and the environmental information, wherein a control mode corresponding to the state to which the arousal level belongs is included, and an environment to be provided to an individual one of the areas is set and managed based on each control mode. The storage apparatus (324 in FIG. 5) storing the arousal level estimation model (325 in FIG. 5) may be used as the storage apparatus 402. The storage apparatus 402 may be used as the storage apparatus that stores the execution results of the intellectual performance tests, the normalized values thereof, the biological information, and the feature values extracted from the biological information. The communication interface 404 may be connected to the sensors 405 and 406 via wireless or wired communication and constitute the communication control parts (31 and in FIG. 3) that acquire the biological information and the environment information.

The arousal level estimation part 30, alone as a single body, may be implemented on the computer system (apparatus) 400. Alternatively, the environment provision section 40, alone as a single body, may be implemented on the computer system (apparatus) 400. The program of the computer system (apparatus) 400 may be installed to the personal computers 3a and 3b in FIG. 2, and these personal computers may be configured to serve as the arousal level estimation part 30 and/or the environment provision section 40.

The disclosure of each of the above PTLs 1-3 is incorporated herein by reference thereto. Variations and adjustments of the example embodiments and examples are possible within the scope of the overall disclosure (including the claims) of the present invention and based on the basic technical concept of the present invention. Various combinations and selections of various disclosed elements (including the elements in the claims, examples, drawings, etc.) are possible within the scope of the claims of the present invention. Namely, the present invention of course includes various variations and modifications that could be made by those skilled in the art according to the overall disclosure including the claims and the technical concept.

What is claimed is:

1. An area-specific environment management system that manages an environment in an individual one of a plurality of areas, the system comprising:
   a processor;
   a memory coupled to the processor and storing a program executable by the processor;
   a biological information sensor that acquires biological information about at least one of an individual and a group who belongs to an individual one of the areas; and
   an environmental information sensor that acquires environmental information about an individual one of the areas,
   wherein the processor, based on the program stored in the memory, is configured to execute:
   an arousal level estimation process that estimates an arousal level with respect to the biological information obtained from the biological information sensor by using an arousal level estimation model; and an environment provision process that provides an environment to an individual one of the areas based on the arousal level and the environmental information obtained from the environmental information sensor, wherein providing the environment includes managing the environment by determining that productivity of the at least one of the individual and the group becomes a desired state in all cases including: a case where the estimated arousal level belongs to a state from sleepy until awakened; a case where the estimated arousal level belongs to a wakeful state; and a case where the estimated arousal level belongs to an excessively wakeful state, an arousal level of the excessively wakeful state being higher than an arousal level of the wakeful state, and wherein managing the environment so that the productivity of the at least one of the individual and the group becomes the desired state includes:

managing the environment so that an arousal state of the at least one of the individual and the group is changed to the wakeful state in the case where the estimated arousal level belongs to a state from sleepy until awakened;

managing the environment so that the arousal state of the at least one of the individual and the group continues to the wakeful state in the case where the estimated arousal level belongs to the wakeful state; and managing the environment so that the arousal state of the at least one of the individual and the group is changed to the wakeful state from the excessively wakeful state in the case where the estimated arousal level belongs to the excessively wakeful state, an arousal level of the excessively wakeful state, wherein managing the environment so that the arousal state of the at least one of the individual and the group is changed to the wakeful state in the case where the estimated arousal level belongs to the state from sleepy until awakened includes:

determining whether the environmental information is suitable for the state from sleepy until awakened; and when it is determined that the environmental information is not suitable, determining a suitable environment for the state from sleepy until awakened, and wherein the arousal level estimation model is generated based on a result of an intellectual performance test taken by the at least one of the individual and the group and a feature of the biological information of the at least one biological information acquired from the biological information sensor while the at least one of the individual and the group takes the intellectual performance test.

2. The area-specific environment management system according to claim 1, wherein the arousal level estimation model includes:

a first arousal level estimation model corresponding to the state from sleepy until awakened; and a second arousal level estimation model corresponding to the excessively wakeful state.

3. The area-specific environment management system according to claim 1, wherein the processor is configured to execute:

an arousal state monitoring process that monitors an arousal state of a measurement target individual based on the biological information about the measurement target individual obtained from the biological information sensor;

an intellectual performance test execution and control process that requests the measurement target individual to take one or more intellectual performance tests responsive to an instruction from the arousal state monitoring process;

a biological information acquisition process that acquires biological information about the measurement target individual who is taking the one or more intellectual performance tests, from the biological information sensor;

a feature value extraction process that extracts a feature value from the biological information obtained by the biological information acquisition process; and an estimation model learning process that generates an arousal level estimation model based on the feature value and a result of the intellectual performance test.

4. The area-specific environment management system according to claim 3, wherein the processor is further configured to execute:

a normalization process that normalizes the result of the intellectual performance tests taken by the measurement target individual by using a representative point, wherein the estimation model learning process generates the arousal level estimation model based on the feature value and the normalized result of the intellectual performance test.

5. The area-specific environment management system according to claim 1, wherein managing the environment so that the arousal state of the at least one of the individual and the group continues to the wakeful state in the case where the estimated arousal level belongs to the wakeful state includes:

determining whether the environmental information is suitable for the wakeful state; and when it is determined that the environmental information is not suitable, determining a suitable environment for the wakeful state.

6. The area-specific environment management system according to claim 1, wherein managing the environment so that the arousal state of the at least one of the individual and the group is changed to the wakeful state from the excessively wakeful state in the case the estimated arousal level belongs to the excessively wakeful state includes:

determining whether the environmental information is suitable for the excessively wakeful state; and when it is determined that the environmental information is not suitable, determining a suitable environment for the excessively wakeful state.

7. The area-specific environment management system according to claim 1, wherein providing the environment includes managing the environment by determining that productivity of the group becomes the desired state in all the cases.

8. The area-specific environment management system according to claim 1, wherein a normalization process comprises at least one of scoring the individual based on a time to solve a problem and average time to solve the problem.

9. The area-specific environment management system according to claim 1, wherein the arousal level is estimated based on the result of the intellectual performance test taken by the at least one of the individual and the group, wherein the result is normalized by using a highest score for the result of the intellectual performance test taken by the at least one of the individual and the group.

10. The area-specific environment management system according to claim 1, wherein the result of the intellectual performance test is weighted based on a content of a work of the at least one of the individual and the group.

11. An area-specific environment management method that manages an environment in an individual one of a plurality of areas, the method comprising:
   acquiring, from a biological information sensor, biological information about at least one of an individual and a group who belongs to an individual one of the areas;
   acquiring, from an environmental information sensor, environmental information about an individual one of the areas;
   estimating an arousal level with respect to the biological information by using an arousal level estimation model; and
   providing an environment to an individual one of the areas based on the arousal level and the environmental information,
   wherein providing the environment includes managing the environment by determining that productivity of the at least one of the individual and the group becomes a desired state in all cases including: a case where the estimated arousal level belongs to a state from sleepy until awakened; a case where the estimated arousal level belongs to a wakeful state; and a case where the estimated arousal level belongs to an excessively wakeful state, an arousal level of the excessively wakeful state being higher than an arousal level of the wakeful state, and
   wherein managing the environment so that the productivity of the at least one of the individual and the group becomes the desired state includes:
   managing the environment so that an arousal state of the at least one of the individual and the group is changed to the wakeful state in the case where the estimated arousal level belongs to the state from sleepy until awakened;
   managing the environment so that the arousal state of the at least one of the individual and the group continues to the wakeful state in the case where the estimated arousal level belongs to the wakeful state; and
   managing the environment so that the arousal state of the at least one of the individual and the group is changed to the wakeful state from the excessively wakeful state in the case where the estimated arousal level belongs to the excessively wakeful state, an arousal level of the excessively wakeful state,
   wherein managing the environment so that the arousal state of the at least one of the individual and the group is changed to the wakeful state in the case where the estimated arousal level belongs to the state from sleepy until awakened includes:
      determining whether the environmental information is suitable for the state from sleepy until awakened; and
      when it is determined that the environmental information is not suitable, determining a suitable environment for the state from sleepy until awakened, and
   wherein the arousal level estimation model is generated based on a result of an intellectual performance test taken by the at least one of the individual and the group and a feature of the biological information of the at least one acquired biological information from the biological information sensor while the at least one of the individual and the group takes the intellectual performance test.

12. The area-specific environment management method according to claim 11, comprising
   estimating the arousal level by using:
   a first arousal level estimation model corresponding to the state from sleepy until awakened; and
   a second arousal level estimation model corresponding to the excessively wakeful state.

13. A non-transitory computer readable recording medium storing therein a program causing a computer that constitutes an area-specific environment management system that manages an environment in an individual one of a plurality of areas, to perform processing comprising:
   acquiring, from a biological information sensor, biological information about at least one of an individual and a group who belongs to an individual one of the areas;
   acquiring, from an environmental information sensor, environmental information about an individual one of the areas;
   estimating an arousal level with respect to the biological information by using an arousal level estimation model,
   wherein providing the environment includes managing the environment by determining that productivity of the at least one of the individual and the group becomes a desired state in all cases including: a case where the estimated arousal level belongs to a state from sleepy until awakened; a case where the estimated arousal level belongs to a wakeful state; and a case where the estimated arousal level belongs to an excessively wakeful state, an arousal level of the excessively wakeful state being higher than an arousal level of the wakeful state, and
   wherein managing the environment so that the productivity of the at least one of the individual and the group becomes the desired state includes:
   managing the environment so that an arousal state of the at least one of the individual and the group is changed to the wakeful state in a case where the estimated arousal level belongs to the state from sleepy until awakened;
   managing the environment so that the arousal state of the at least one of the individual and the group continues to the wakeful state in the case where the estimated arousal level belongs to the wakeful state; and
   managing the environment so that the arousal state of the at least one of the individual and the group is changed to the wakeful state from the excessively wakeful state in the case where the estimated arousal level belongs to the excessively wakeful state, an arousal level of the excessively wakeful state,
   wherein managing the environment so that the arousal state of the at least one of the individual and the group is changed to the wakeful state in the case where the estimated arousal level belongs to the state from sleepy until awakened includes:
      determining whether the environmental information is suitable for the state from sleepy until awakened; and
      when it is determined that the environmental information is not suitable, determining a suitable environment for the state from sleepy until awakened, and
   wherein the arousal level estimation model is generated based on a result of an intellectual performance test taken by the at least one of the individual and the group and a feature of the biological information of the at least one acquired biological information from the biological information sensor while the at least one of the individual and the group takes the intellectual performance test.

14. The non-transitory computer readable recording medium according to claim 13, wherein the processing for estimating an arousal level estimates the arousal level by using a first arousal level estimation model corresponding to the state from sleepy until awakened and a second arousal level estimation model corresponding to the excessively wakeful state.

15. The area-specific environment management method according to claim 11, comprising:
monitoring an arousal state of a measurement target individual based on the biological information about the measurement target individual obtained from the biological information sensor;
requesting the measurement target individual to take one or more intellectual performance tests responsive to an instruction from the monitoring an arousal state step;
acquiring biological information about the measurement target individual who is taking the one or more intellectual performance tests, from the biological information sensor;
extracting a feature value from the biological information about the measurement target individual; and
generating an arousal level estimation model based on the feature value and a result of the intellectual performance test.

16. The area-specific environment management method according to claim 15, comprising:
normalizing the result of the intellectual performance tests taken by the measurement target individual by using a representative point; and
generating the arousal level estimation model based on the feature value and the normalized result of the intellectual performance test.

* * * * *